US012374079B2

(12) United States Patent
Rodrigues et al.

(10) Patent No.: US 12,374,079 B2
(45) Date of Patent: Jul. 29, 2025

(54) IMAGE MATCHING APPARATUS, CONTROL METHOD, AND NON-TRANSITORY COMPUTER-READABLE STORAGE MEDIUM

(71) Applicant: NEC Corporation, Tokyo (JP)

(72) Inventors: Royston Rodrigues, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 362 days.

(21) Appl. No.: 18/021,291

(22) PCT Filed: Aug. 25, 2020

(86) PCT No.: PCT/JP2020/031939
§ 371 (c)(1),
(2) Date: Feb. 14, 2023

(87) PCT Pub. No.: WO2022/044104
PCT Pub. Date: Mar. 3, 2022

(65) Prior Publication Data
US 2023/0298311 A1    Sep. 21, 2023

(51) Int. Cl.
*G06V 10/74*       (2022.01)
*G06V 10/44*       (2022.01)
(Continued)

(52) U.S. Cl.
CPC ............ *G06V 10/761* (2022.01); *G06V 10/44* (2022.01); *G06V 10/771* (2022.01); *G06V 10/82* (2022.01); *G06V 20/17* (2022.01)

(58) Field of Classification Search
CPC .................. G06F 18/24133; G06V 10/44; G06V 10/761; G06V 10/771; G06V 10/811; G06V 10/82; G06V 20/10; G06V 20/17
See application file for complete search history.

(56) References Cited

U.S. PATENT DOCUMENTS

2020/0151448 A1\*   5/2020   Lin .................... G06N 3/08

FOREIGN PATENT DOCUMENTS

| CN | 111091125 A | \* | 5/2020 | ............. G06F 18/22 |
| JP | 2017-146907 A | | 8/2017 | |
| JP | 2018-194950 A | | 12/2018 | |

OTHER PUBLICATIONS

Altwaijry, H., Trulls, E., Hays, J., Fua, P., & Belongie, S. (2016). Learning to match aerial images with deep attentive architectures. In Proceedings of the IEEE Conference on Computer Vision and Pattern Recognition (pp. 3539-3547). (Year: 2016).\*

(Continued)

*Primary Examiner* — Michael J Vanchy, Jr.
(74) *Attorney, Agent, or Firm* — Sughrue Mion, PLLC

(57) ABSTRACT

The image matching apparatus (2000) comprises a ground-view feature extractor (2020), an aerial-view feature extractor (2040), and a determination unit (2060). The ground-view feature extractor (2020) extracts features from the ground-view image (20) to generate feature maps without attention mechanism and feature maps with attention mechanism. The aerial-view feature extractor (2040) extracts features from the aerial-view image (30) to generate feature maps without attention mechanism and feature maps with attention mechanism. The determination unit (2060) computes a similarity score, which indicates a degree of similarity between the ground-view image (20) and the aerial-view image (30), based on the generated feature maps. Then, the determination unit (2060) determines whether the ground-view image (20) matches the aerial-view image (30) based on the similarity score.

15 Claims, 12 Drawing Sheets

(51) Int. Cl.
G06V 10/771 (2022.01)
G06V 10/82 (2022.01)
G06V 20/17 (2022.01)

(56) References Cited

OTHER PUBLICATIONS

International Search Report for PCT Application No. PCT/JP2020/031939, mailed on Oct. 27, 2020.
Written opinion for PCT Application No. PCT/JP2020/031939, mailed on Oct. 27, 2020.
Liu Liu and Hongdong Li, "Lending Orientation to Neural Networks for Cross-view Geo-localization," Computer Research Repository, arXiv:1903.12351, Mar. 29, 2019.
Ashish Sinha and Jose Dolz, "Multi-scale guided attention for medical image segmentation," Computer Research Repository, arXiv:1906.02849, Jun. 7, 2019.
Tsung-Yi Lin et al., "Learning Deep Representations for Ground-to-Aerial Geolocalization", 2015 IEEE Conference on Computer Vision and Pattern Recognition (CVPR), IEEE, 2015, 5007-5015.

* cited by examiner

IMAGE MATCHING APPARATUS, CONTROL METHOD, AND NON-TRANSITORY COMPUTER-READABLE STORAGE MEDIUM

This application is a National Stage Entry of PCT/JP2020/031939 filed on Aug. 25, 2020, the contents of all of which are incorporated herein by reference, in their entirety.

TECHNICAL FIELD

The present disclosure generally relates to image matching, in particular, matching between a ground-view image and an aerial-view image.

BACKGROUND ART

A computer system that performs ground-to-aerial cross-view matching (matching between a ground-view image and an aerial-view image) has been developed. For example, NPL1 discloses a discriminator comprising a set of CNNs (Convolutional Neural Networks) for extracting features from a ground-view image and an aerial-view image to be compared with each other. Specifically, one of the CNNs acquires a ground-view image and orientation information corresponding thereto, and computes joint features from the mixed signal containing the ground-view image and the orientation information. The other one acquires an aerial-view image and orientation information corresponding thereto, and computes joint features from the mixed signal containing the aerial-view image and the orientation information. Then, whether the ground-view image matches the aerial-view image is determined based on the computed joint features.

CITATION LIST

Non Patent Literature

NPL1: Liu Liu and Hongdong Li, "Lending Orientation to Neural Networks for Cross-view Geo-localization," Computer Research Repository, arXiv:1903.12351, Mar. 29, 2019

NPL2: Ashish Shinha and Jose Dolz, "Multi-scale self-guided attention for medical image segmentation," Computer Research Repository, arXiv:1906.02849, Jun. 7, 2019

SUMMARY OF INVENTION

Technical Problem

Inventors of the present invention considers to utilize an attention map to improve accuracy of ground-to-aerial cross-view matching. Although NPL2 discloses a CNN utilizing attention maps, it aims at improving accuracy of medical image segmentation.

An objective of the present disclosure is to provide a technique to improve accuracy of ground-to-aerial cross-view matching.

Solution to Problem

The present disclosure provides an image matching apparatus that comprises at least one processor and memory storing instructions. The at least one processor is configured to execute the instructions to: acquire a ground-view image and an aerial-view image; generate ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map; generate aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map; compute a similarity score based on the ground-view feature maps and the aerial-view feature maps, the similarity score indicating a degree of similarity between the ground-view image and the aerial-view image; and determine whether the ground-view image matches the aerial-view image based on the similarity score.

The present disclosure further provides a control method that is performed by a computer. The control method comprises: acquiring a ground-view image and an aerial-view image; generating ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map; generating aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map; computing a similarity score based on the ground-view feature maps and the aerial-view feature maps, the similarity score indicating a degree of similarity between the ground-view image and the aerial-view image; and determining whether the ground-view image matches the aerial-view image based on the similarity score.

The present disclosure further provides a non-transitory computer readable storage medium storing a program. The program that causes a computer to execute: acquiring a ground-view image and an aerial-view image; generating ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map; generating aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map; computing a similarity score based on the ground-view feature maps and the aerial-view feature maps, the similarity score indicating a degree of similarity between the ground-view image and the aerial-view image; and determining whether the ground-view image matches the aerial-view image based on the similarity score.

Advantageous Effects of Invention

According to the present disclosure, it is possible to provide a technique to improve accuracy of ground-to-aerial cross-view matching.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary.

First Example Embodiment

Overview

Figure 1:
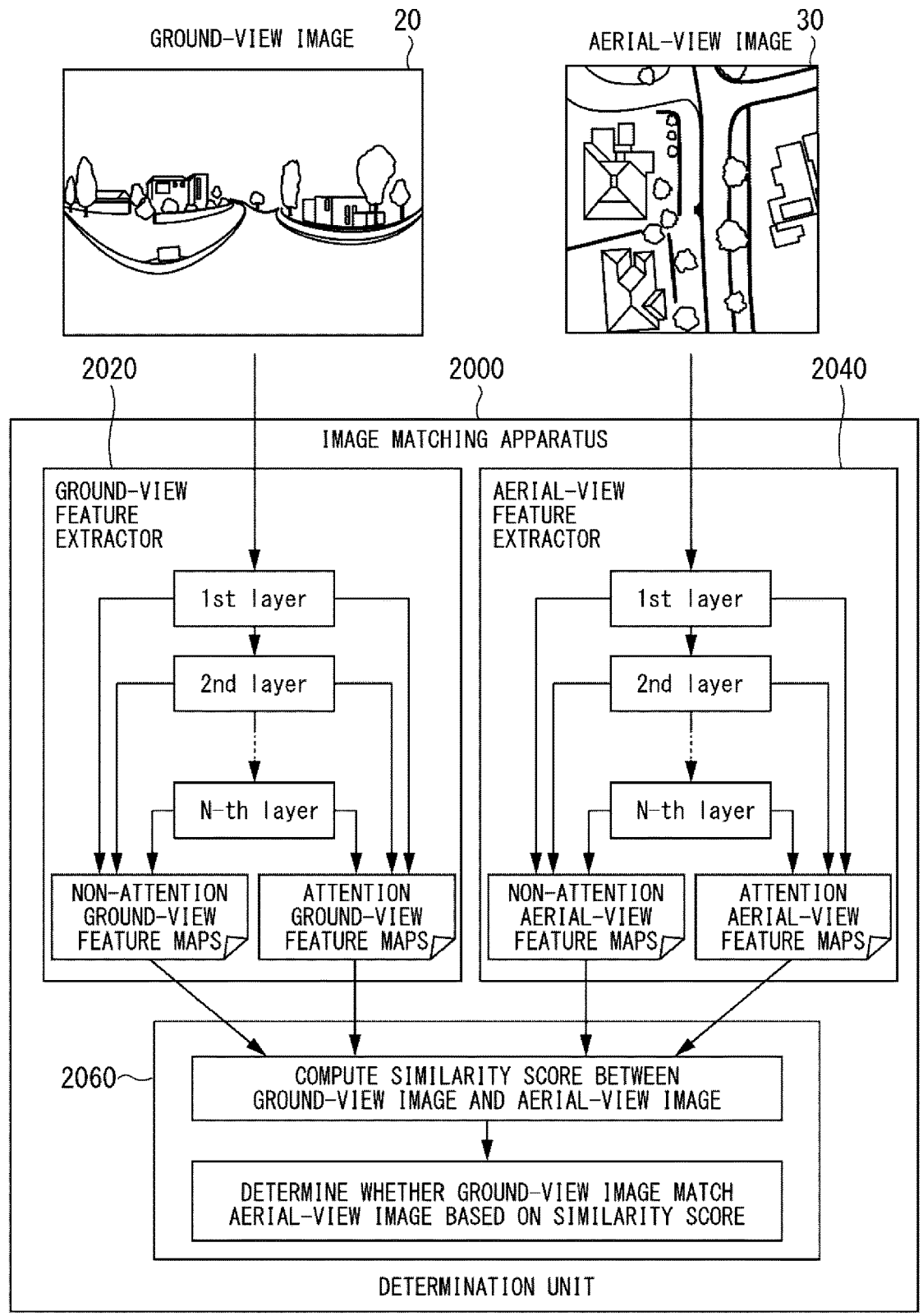
FIG. 1 illustrates an overview of an image matching apparatus 2000 of the 1st example embodiment.

FIG. 1 illustrates an overview of an image matching apparatus 2000 of the 1st example embodiment. The image matching apparatus 2000 functions as a discriminator that performs matching between a ground-view image and an aerial-view image (so-called ground-to-aerial cross-view matching). The ground-view image is an image including a ground view of a place. For example, the ground-view image is captured by pedestrians, cars, and etc. The ground-view image may be panoramic in nature (having a 360-degree field of view), or may have a limited (less than 360-degree) field of view. The aerial-view image is an image including a top view of a place. For example, the aerial-view image is captured by a drone, air plane, satellite, and etc. Specifically, the image matching apparatus 2000 acquires a ground-view image and an aerial-view image, and determines whether the acquired ground-view image matches the acquired aerial-view image. Note that "the ground-view image matches the aerial-view image" means that the location where the ground-view image is captured is included in the aerial-view image.

The image matching apparatus 2000 comprises a ground-view feature extractor 2020, an aerial-view feature extractor 2040, and a determination unit 2060. The ground-view feature extractor 2020 extracts features from the ground-view image 20 to generate non-attention ground-view feature maps and attention ground-view feature maps. The non-attention ground-view feature maps are feature maps that is derived from the ground-view image 20 and generated without using attention maps. On the other hand, the attention ground-view feature maps are feature maps that are derived from the ground-view image 20 and generated using attention maps. The ground-view feature extractor 2020 comprises multiple layers, and each layer generates a non-attention ground-view map and an attention ground-view feature map. Hereinafter, non-attention ground-view feature maps and attention ground-view feature maps are collectively described as "ground-view feature maps".

The aerial-view feature extractor 2040 extracts features from the aerial-view image 20 to generate non-attention aerial-view feature maps and attention aerial-view feature maps. The non-attention aerial-view feature maps are feature maps that are derived from the aerial-view image 20 and generated without using attention maps. On the other hand, the attention aerial-view feature maps are feature maps that are derived from the aerial-view image 30 and generated using attention maps. The aerial-view feature extractor 2040 comprises multiple layers, and each layer generates a non-attention aerial-view map and an attention aerial-view feature map. Hereinafter, non-attention aerial-view feature maps and attention aerial-view feature maps are collectively described as "aerial-view feature maps".

The determination unit 2060 computes a similarity score, which indicates a degree of similarity between the ground-view image 20 and the aerial-view image 30, based on the ground-view feature maps and the aerial-view feature maps.

Then, the determination unit 2060 determines whether the ground-view image 20 matches the aerial-view image 30 based on the similarity score.

<Example of Advantageous Effect>

According to the image matching apparatus 2000 of the 1st example embodiment, not only the non-attention ground-view feature maps and the non-attention aerial-view feature maps (i.e. feature maps generated without attention mechanism), but also the attention ground-view feature maps and the aerial-view feature maps (i.e. feature maps generated with attention mechanism) are used for ground-to-aerial cross-view matching. By applying attention mechanism to ground-to-aerial cross-view matching, the image matching apparatus 2000 can determine whether the ground-view image 20 matches the aerial-view image 30 more precisely than the case where attention mechanism is not applied.

Hereinafter, more detailed explanation of the image matching apparatus 2000 will be described.

<Example of Functional Configuration>

Figure 2:
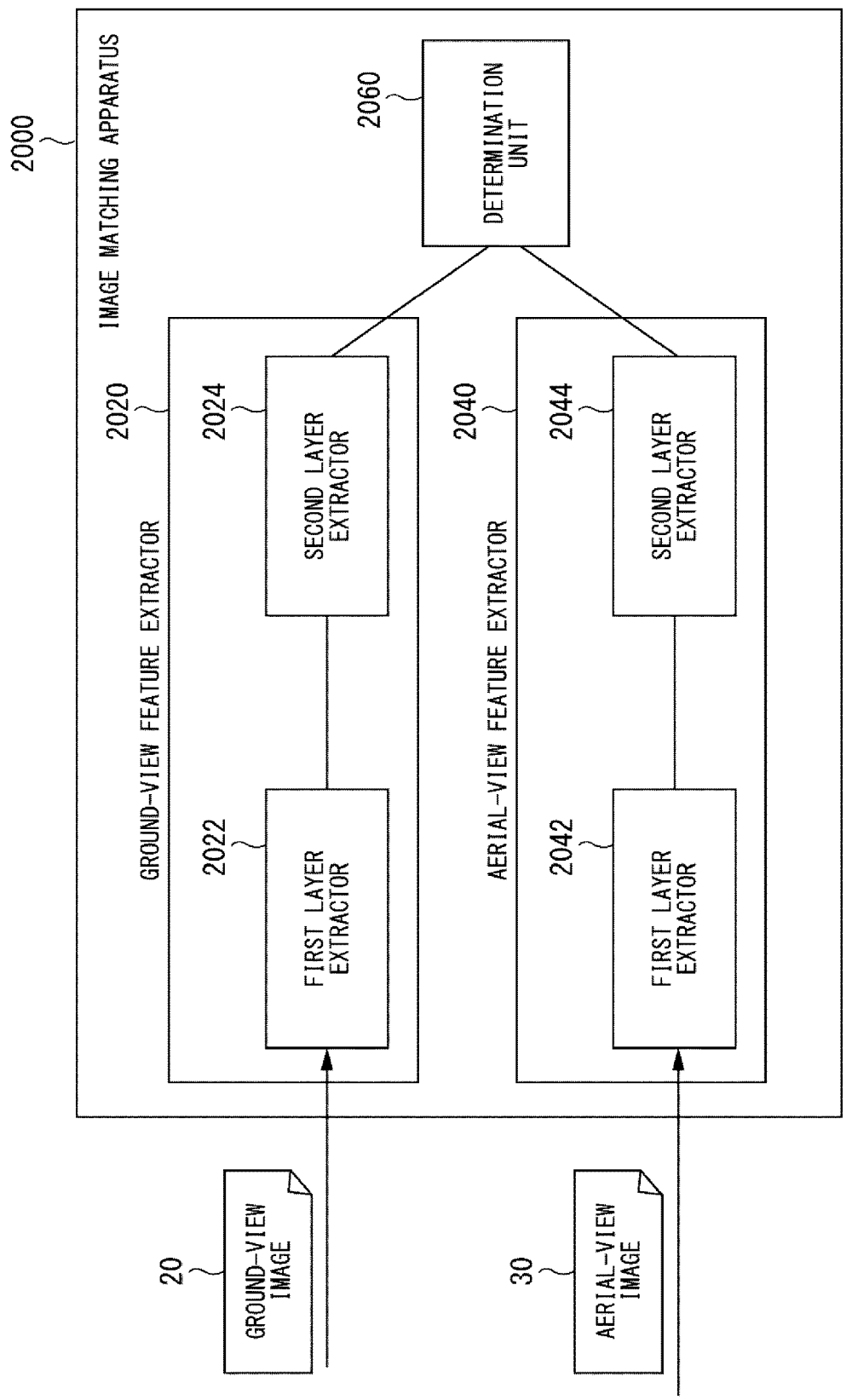
FIG. 2 is a block diagram illustrating an example of a functional configuration of the image matching apparatus.
Figure 3:
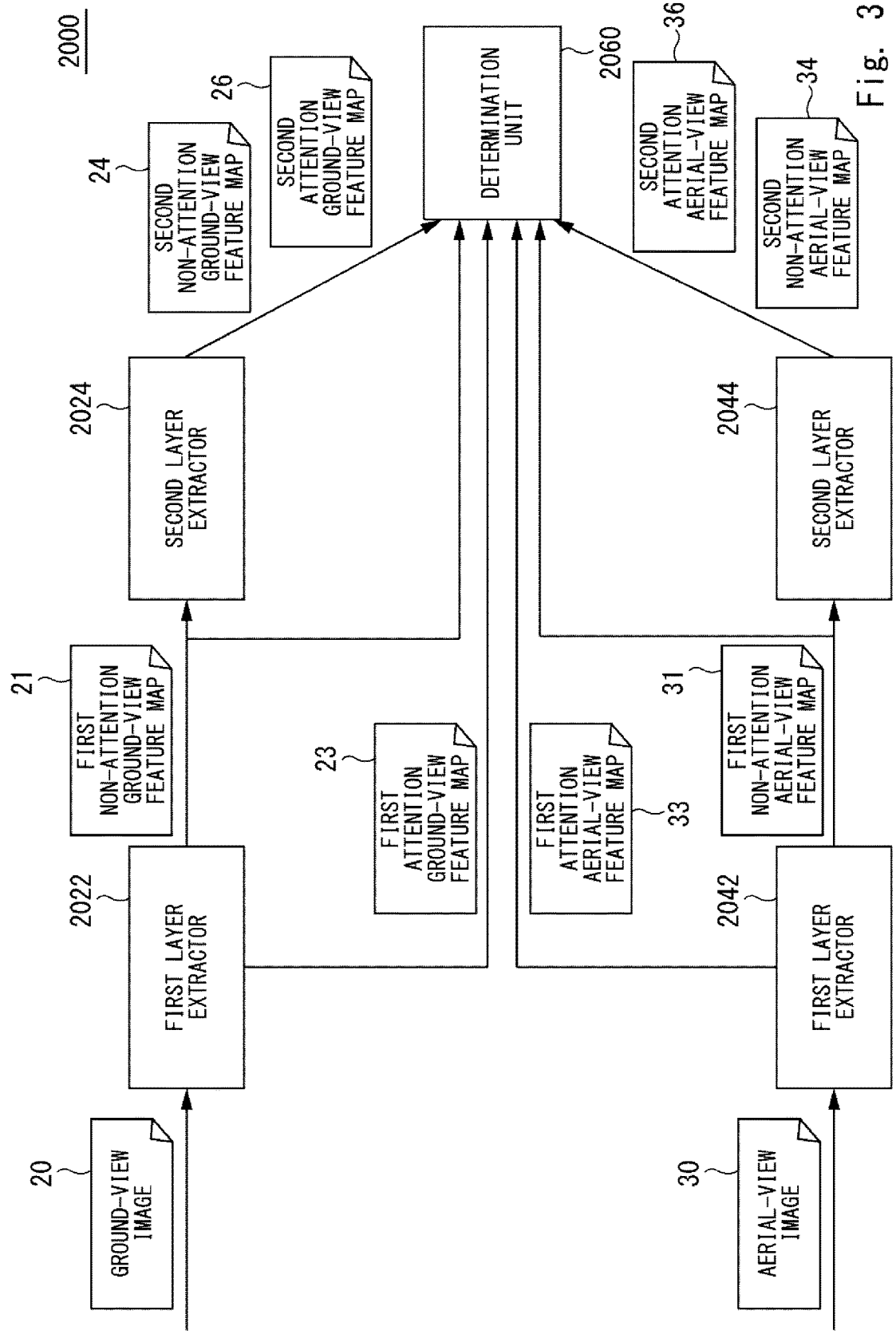
FIG. 3 illustrates a flow of data in the image matching apparatus.
Figure 4:
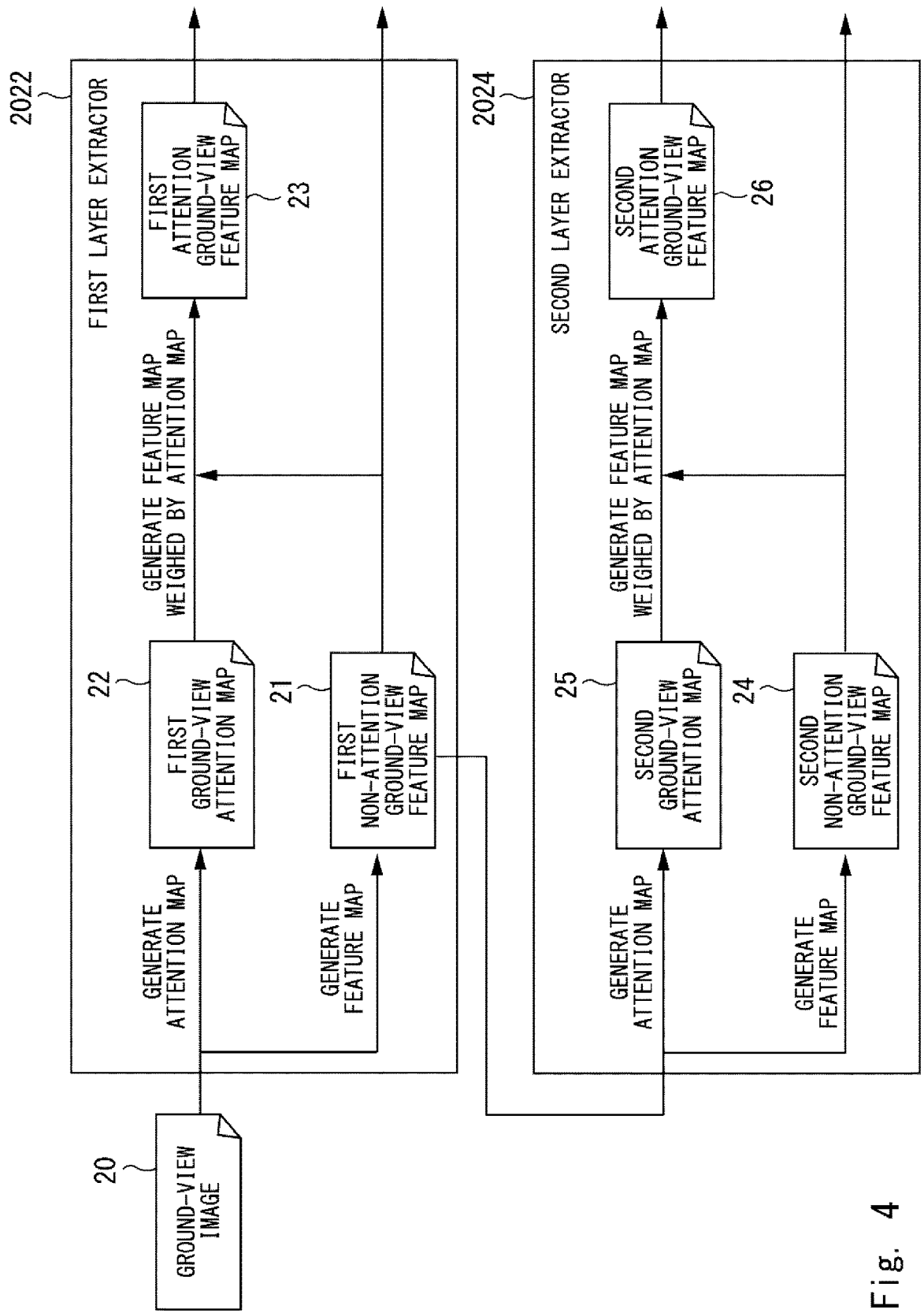
FIG. 4 illustrates overall functions of the ground-view feature extractor.
Figure 5:
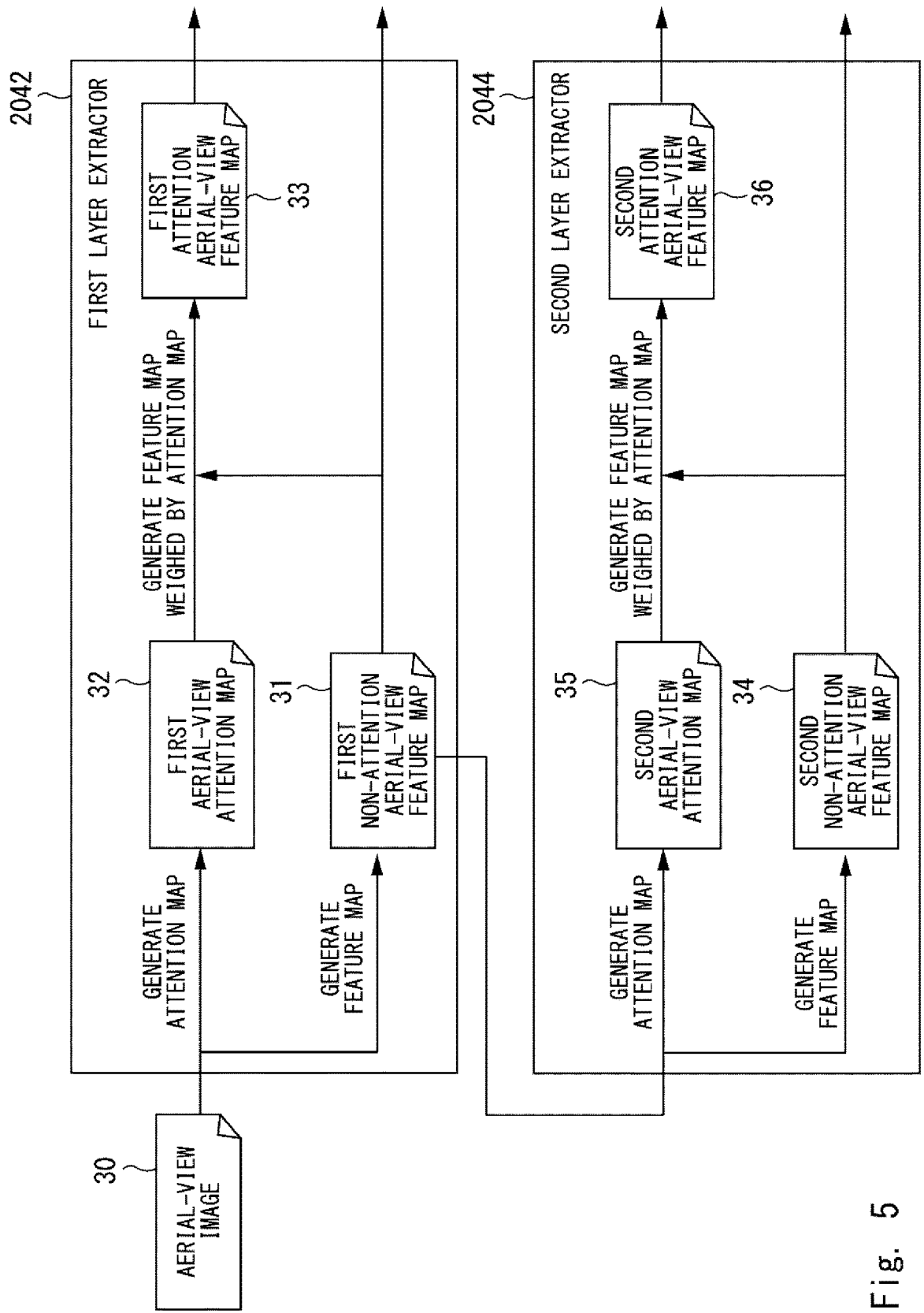
FIG. 5 illustrates overall functions of the aerial-view feature extractor.

An example of the overall functional configuration of the image matching apparatus 2000 is depicted by FIG. 1. Here, referring to FIGS. 2 to 5, a more specific example will be described regarding the case where the ground-view feature extractor 2020 and the aerial-view feature extractor 2040 have two layers of units to generate feature maps. FIG. 2 is a block diagram illustrating an example of a functional configuration of the image matching apparatus 2000. FIG. 3 illustrates a flow of data in the image matching apparatus 2000. FIG. 4 illustrates overall functions of the ground-view feature extractor 2020. FIG. 5 illustrates overall functions of the aerial-view feature extractor 2040.

As to the ground-view feature extractor 2020, it includes a first layer extractor 2022 and a second layer extractor 2024 (See FIG. 2). As illustrated in FIG. 4, the first layer extractor 2022 acquires the ground-view image 20 and outputs a first non-attention ground-view feature map 21 and a first attention ground-view feature map 23. The first non-attention ground-view feature map 21 is one of the non-attention ground-view feature maps, and includes one or more feature maps derived from the ground-view image 20. The first non-attention ground-view feature map 21 is generated by extracting features from the ground-view image 20.

The first attention ground-view feature map 23 is one of the attention ground-view feature maps, and includes one or more feature maps that are generated based on the first non-attention ground-view feature map 21 and a first ground-view attention map 22. The first ground-view attention map 22 is an attention map generated from the ground-view image 20, which represents a spatial distribution of degree of attention to be paid on the ground-view image 20. The first layer extractor 2022 applies the first ground-view attention map 22 to the first non-attention ground-view feature map 21, thereby generating the first attention ground-view feature map 23 that represents features extracted from the ground-view image 20 that are weighed by the first ground-view attention map 22.

Also as illustrated in FIG. 4, the second layer extractor 2024 acquires the first non-attention ground-view feature map 21 and outputs a second non-attention ground-view feature map 24 and a second attention ground-view feature map 26. The second non-attention ground-view feature map 24 is one of the non-attention ground-view feature maps, and includes one or more feature maps derived from the first non-attention ground-view feature map 21. The second non-attention ground-view feature map 23 is generated by extracting features from the first non-attention ground-view feature map 21.

The second attention ground-view feature map 26 is one of the attention ground-view feature maps, and includes one or more feature maps that are generated based on the second non-attention ground-view feature map 24 and a second ground-view attention map 25. The second ground-view attention map 25 is an attention map generated from the first non-attention ground-view feature map 21, which represents a spatial distribution of degree of attention to be paid on the first non-attention ground-view feature map 21. The second layer extractor 2024 applies the second ground-view attention map 25 to the second non-attention ground-view feature map 24, thereby generating the second attention ground-view feature map 26 that represents features extracted from the first non-attention ground-view feature map 24 that are weighed by the second ground-view attention map 25.

As to the aerial-view feature extractor 2040, it includes a first layer extractor 2042 and a second layer extractor 2044 (See FIG. 2). As illustrated in FIG. 5, the first layer extractor 2042 acquires the aerial-view image 30 and outputs a first non-attention aerial-view feature map 31 and a first attention aerial-view feature map 33. The first non-attention aerial-view feature map 31 is one of the non-attention aerial-view feature maps, and includes one or more feature maps derived from the aerial-view image 30. The first non-attention aerial-view feature map 31 is generated by extracting features from the aerial-view image 30.

The first attention aerial-view feature map 33 is one of the attention aerial-view feature maps, and includes one or more feature maps that are generated based on the first non-attention aerial-view feature map 31 and a first aerial-view attention map 32. The first aerial-view attention map 32 is an attention map generated from the aerial-view image 30, which represents a spatial distribution of degree of attention to be paid on the aerial-view image 30. The first layer extractor 2042 applies the first aerial-view attention map 32 to the first non-attention aerial-view feature map 31, thereby generating the first attention aerial-view feature map 33 that represents features extracted from the aerial-view image that are weighed by the first aerial-view attention map 32.

Also as illustrated in FIG. 5, the second layer extractor 2044 acquires the first non-attention aerial-view feature map 31 and outputs a second non-attention aerial-view feature map 34 and a second attention aerial-view feature map 36. The second non-attention aerial-view feature map 34 is one of the non-attention aerial-view feature maps, and includes one or more feature maps derived from the first non-attention aerial-view feature map 31. The second non-attention aerial-view feature map 34 is generated by extracting features from the first non-attention aerial-view feature map 31.

The second attention aerial-view feature map 36 is one of the attention aerial-view feature maps, and includes one or more feature maps that are generated based on the second non-attention aerial-view feature map 34 and a second aerial-view attention map 35. The second aerial-view attention map 35 is an attention map generated from the first non-attention aerial-view feature map 34, which represents a spatial distribution of degree of attention to be paid on the first non-attention aerial-view feature map 34. The second layer extractor 2044 applies the second aerial-view attention map 35 to the second non-attention aerial-view feature map 34, thereby generating the second attention aerial-view feature map 36 that represents features extracted from the first non-attention aerial-view feature map 31 that are weighed by the second aerial-view attention map 35.

As illustrated in FIG. 3, the determination unit 2060 acquires the non-attention ground-view feature maps (the first non-attention ground-view feature map 21 and the second non-attention feature map 24), the attention ground-view feature maps (the first attention ground-view feature map 23 and the second attention ground-view feature map 26), the non-attention aerial-view feature maps (the first non-attention aerial-view feature map 31 and the second non-attention feature map 34), and the attention aerial-view feature maps (the first attention aerial-view feature map 33 and the second attention aerial-view feature map 36). The determination unit 2060 computes the similarity score between the ground-view image 20 and the aerial-view image 30 based on those acquired feature maps, and determines whether the ground-view image 20 matches the aerial-view image 30 based on the similarity score.

<Example of Hardware Configuration>

The image matching apparatus 2000 may be realized by one or more computers. Each of the one or more computers may be a special-purpose computer manufactured for implementing the image matching apparatus 2000, or may be a general-purpose computer like a personal computer (PC), a server machine, or a mobile device. The image matching apparatus 2000 may be realized by installing an application in the computer. The application is implemented with a program that causes the computer to function as the image matching apparatus 2000. In other words, the program is an implementation of the functional units of the image matching apparatus 2000.

Figure 6:
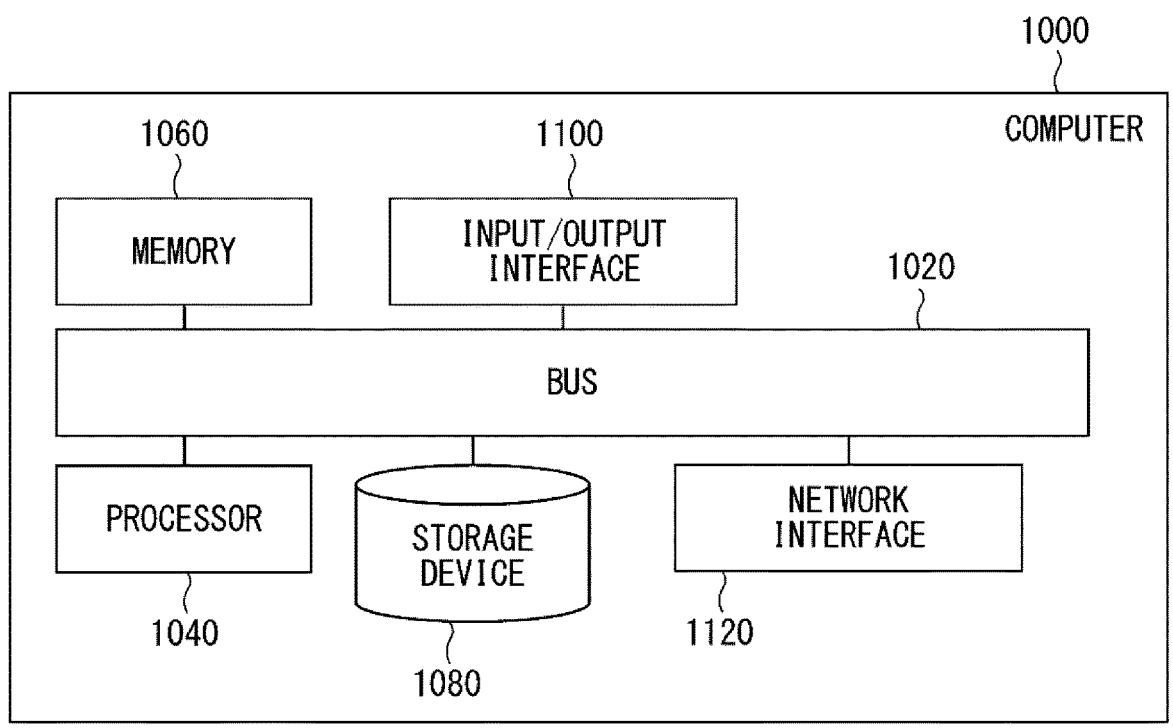
FIG. 6 is a block diagram illustrating an example of the hardware configuration of a computer realizing the training apparatus.

FIG. 6 is a block diagram illustrating an example of the hardware configuration of a computer 1000 realizing the image matching apparatus 2000. In FIG. 6, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The CPU 1040 executes the program to realize each functional unit of the image matching apparatus 2000.

The hardware configuration of the computer 1000 is not limited to the configuration shown in FIG. 6. For example, as mentioned-above, the image matching apparatus 2000 may be realized by plural computers. In this case, those computers may be connected with each other through the network.

<Flow of Process>

Figure 7:
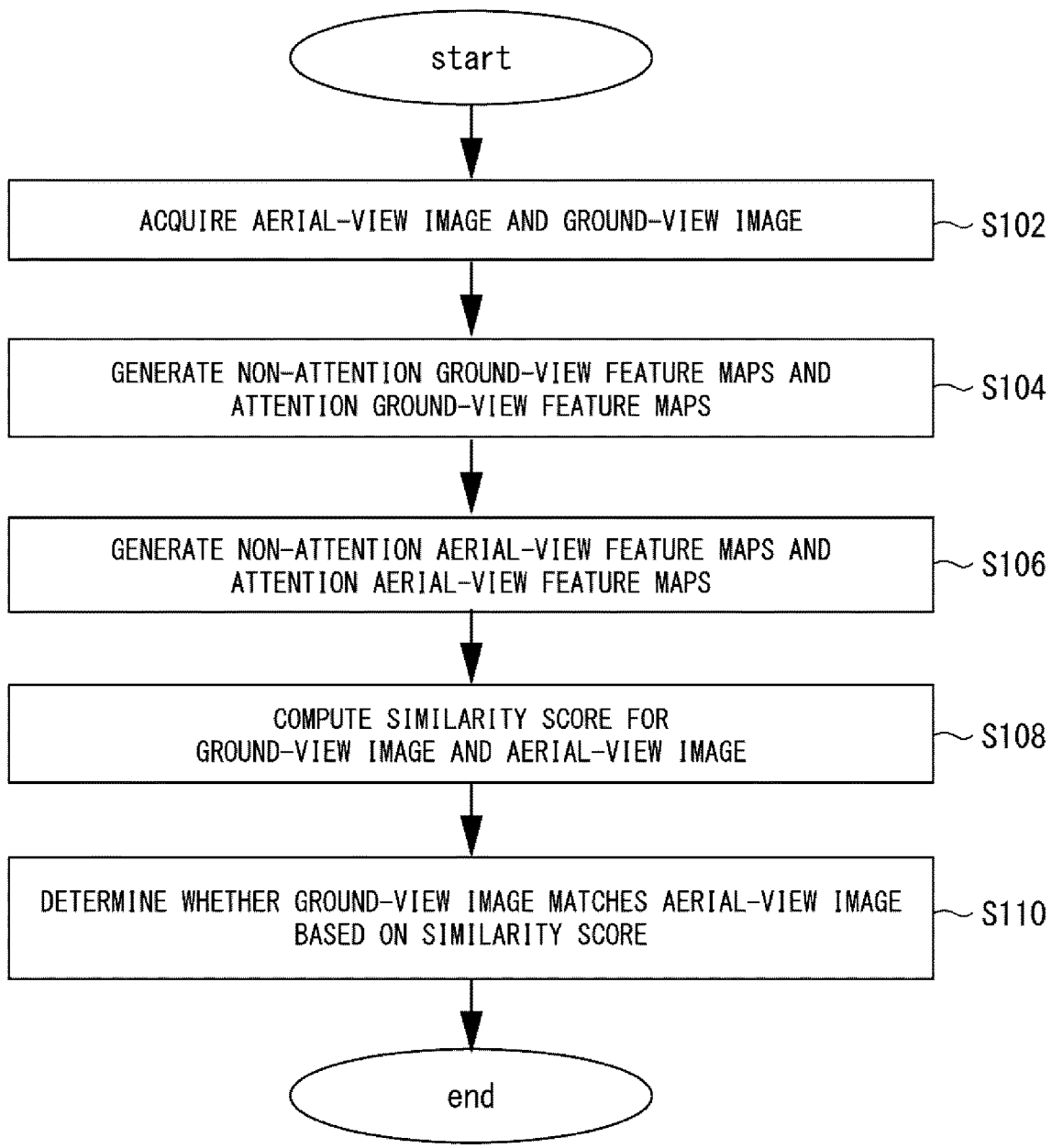
FIG. 7 is a flowchart illustrating an example of an overall flow of process performed by the image matching apparatus.

FIG. 7 is a flowchart illustrating an example of an overall flow of process performed by the image matching apparatus 2000. The image matching apparatus acquires the ground-view image 20 and the aerial-view image 30 (S102). The ground-view feature extractor 2020 generates the non-attention ground-view feature maps and the attention ground-view feature maps (S104). The aerial-view feature extractor 2040 generates the non-attention aerial-view feature maps and the attention aerial-view feature maps (S106).

The determination unit 2060 computes the similarity score for the ground-view image 20 and the aerial-view image 30 (S108). The determination unit 2060 determines whether the ground-view image 20 matches the aerial-view image 30 based on the similarity score (S110).

Note that the flow of process performed by the image matching apparatus 2000 is not limited to one depicted by FIG. 7. For example, Step S106 may can be performed before or in parallel with Step S106.

Figure 8:
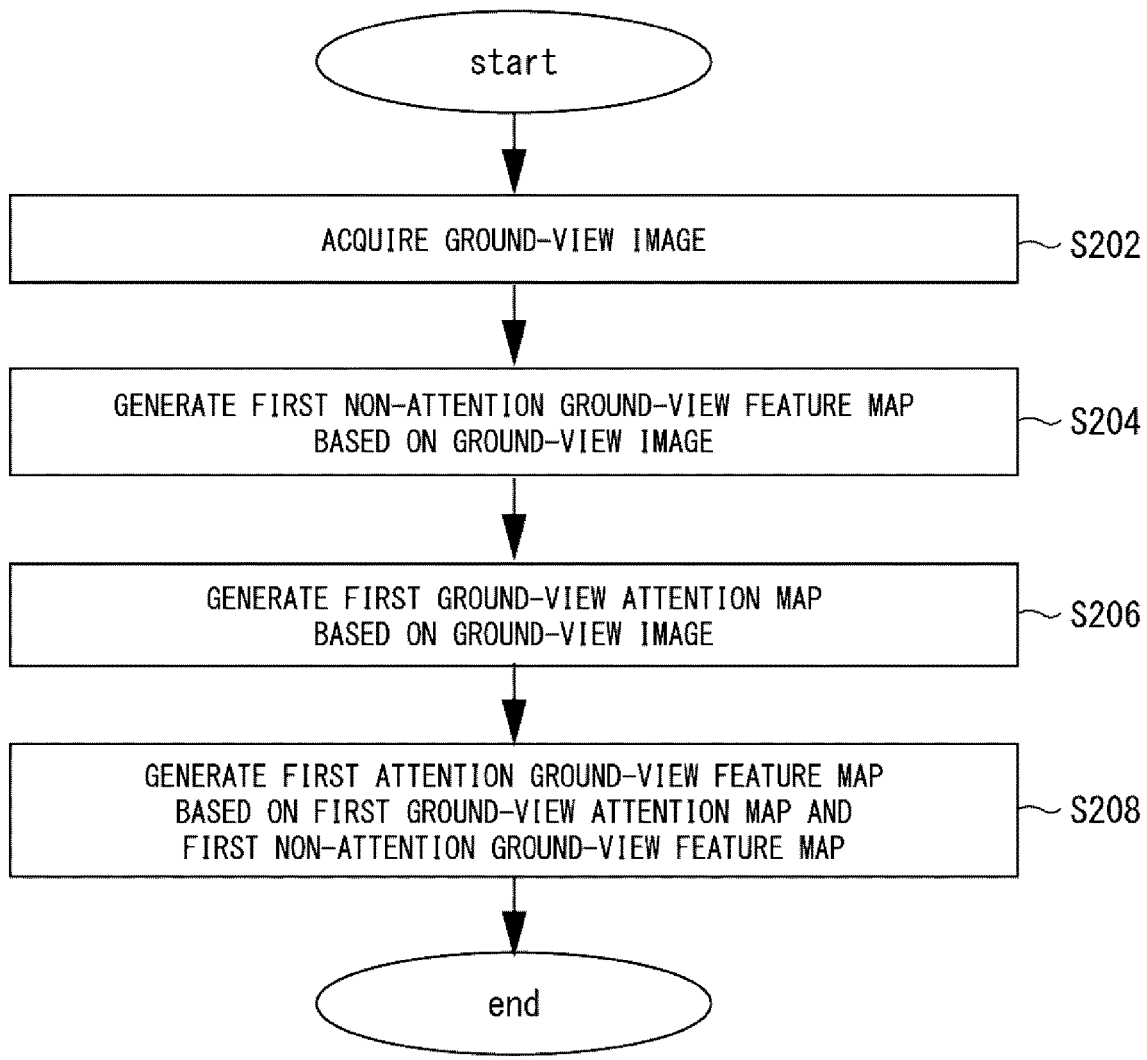
FIG. 8 is a flowchart illustrating an example flow of process performed by the first layer extractor of the ground-view feature extractor.

In the case where the image matching apparatus 2000 includes two layers of units to generate feature maps, Step S104 in FIG. 7 is performed by the first extractor 2022 and the second extractor 2024. FIG. 8 is a flowchart illustrating an example flow of process performed by the first layer extractor 2022. The first layer extractor 2022 acquires the ground-view image 20 (S202). The first layer extractor 2022 generates the first non-attention ground-view feature map 21 based on the ground-view image 20 (S204). The first layer extractor 2022 generates the first ground-view attention map 22 based on the ground-view image 20 (S206). The first layer extractor 2022 generates the first attention ground-view feature map 23 based on the first non-attention ground-view feature map 21 and the first ground-view attention map 22 (S208).

Figure 9:
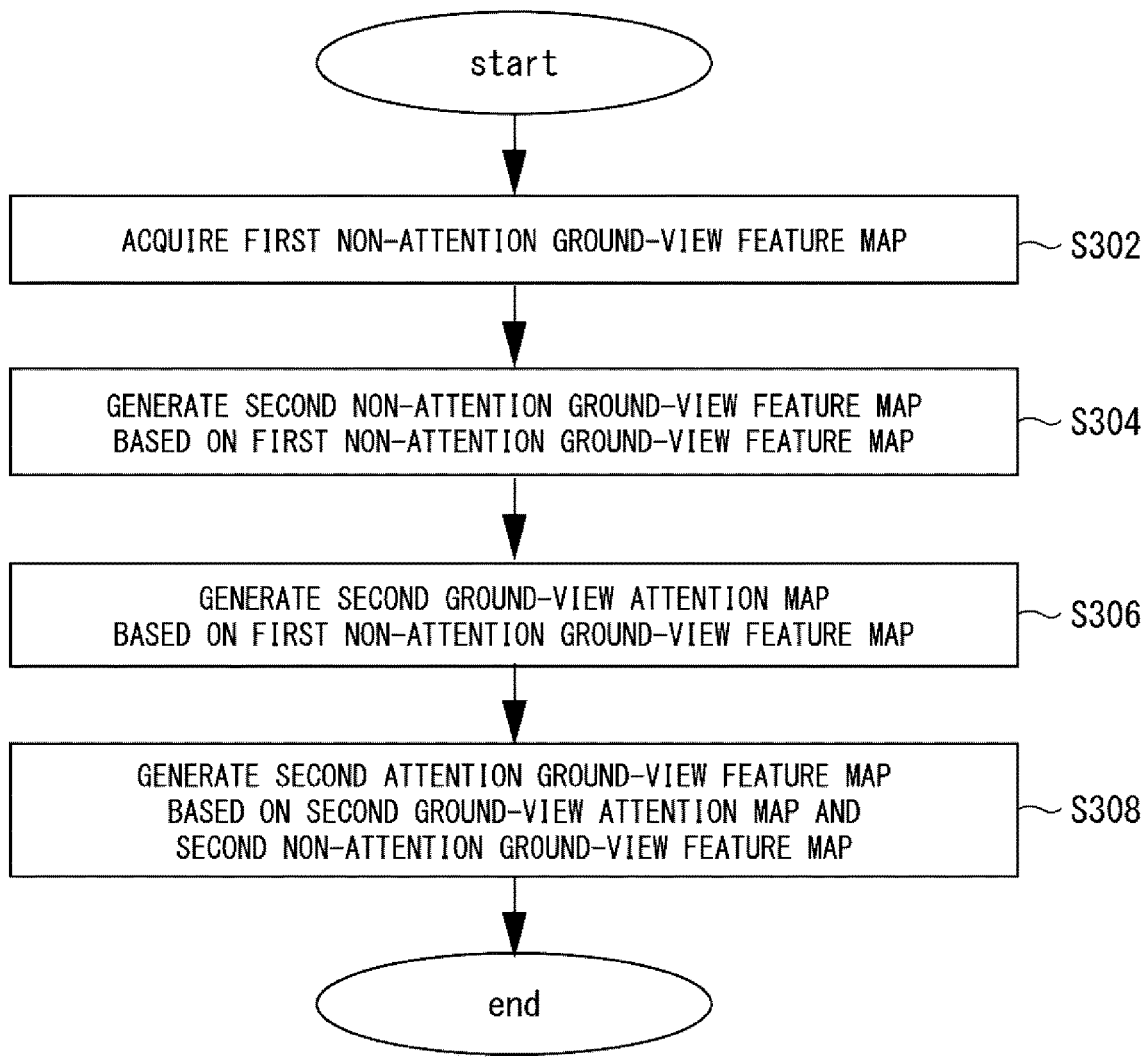
FIG. 9 is a flowchart illustrating an example flow of process performed by the second layer extractor of the ground-view feature extractor.

FIG. 9 is a flowchart illustrating an example flow of process performed by the second layer extractor 2024. The second layer extractor 2024 acquires the first non-attention ground-view feature map 21 (S302). The second layer extractor 2024 generates the second non-attention ground-view feature map 24 based on the first non-attention ground-view feature map 21 (S304). The second layer extractor 2024 generates the second ground-view attention map 25 based on the first non-attention ground-view feature map 21 (S306). The second layer extractor 2024 generates the second attention ground-view feature map 26 based on the second non-attention ground-view feature map 24 and the second ground-view attention map 25 (S308).

Figure 10:
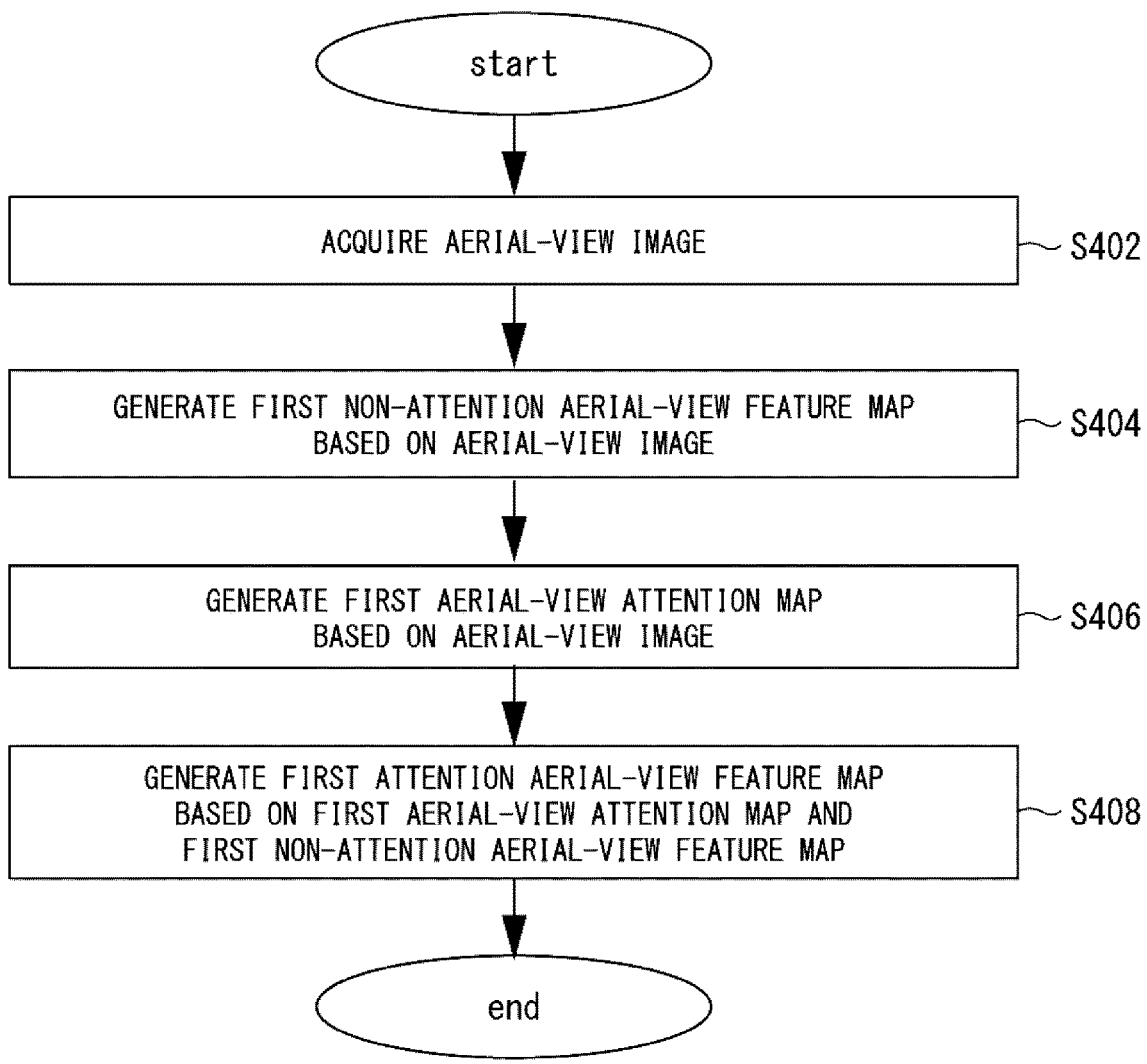
FIG. 10 is a flowchart illustrating an example flow of process performed by the first layer extractor of the aerial-view feature extractor.

Similarly, in the case where the image matching apparatus 2000 includes two layers of units to generate feature maps, Step S106 in FIG. 7 is performed by the first extractor 2042 and the second extractor 2044. FIG. 10 is a flowchart illustrating an example flow of process performed by the first layer extractor 2042. The first layer extractor 2042 acquires the aerial-view image 30 (S402). The first layer extractor 2042 generates the first non-attention aerial-view feature map 31 based on the aerial-view image 30 (S404). The first layer extractor 2042 generates the first aerial-view attention map 32 based on the aerial-view image 30 (S406). The first layer extractor 2042 generates the first attention aerial-view feature map 33 based on the first non-attention aerial-view feature map 31 and the first aerial-view attention map 32 (S408).

Figure 11:
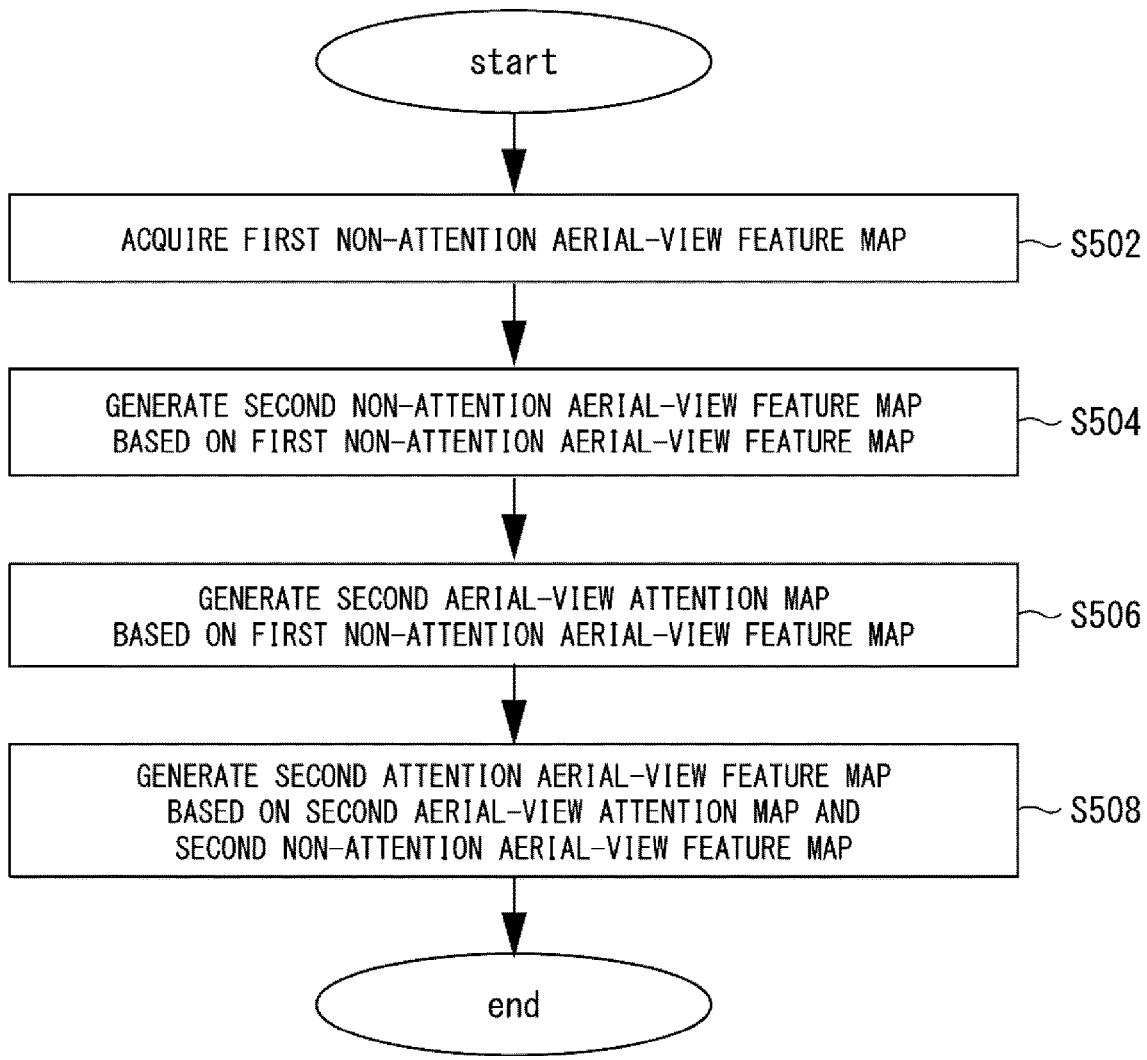
FIG. 11 is a flowchart illustrating an example flow of process performed by the second layer extractor of the aerial-view feature extractor.

FIG. 11 is a flowchart illustrating an example flow of process performed by the second layer extractor 2044. The second layer extractor 2044 acquires the first non-attention aerial-view feature map 31 (S502) The second layer extractor 2044 generates the second non-attention aerial-view feature map 34 based on the first non-attention aerial-view feature map 31 (S504). The second layer extractor 2044 generates the second aerial-view attention map 35 based on the first non-attention aerial-view feature map 31 (S506). The second layer extractor 2044 generates the second attention aerial-view feature map 36 based on the second non-attention aerial-view feature map 34 and the second aerial-view attention map 35 (S508).

Example Application of Image Matching Apparatus 2000

There are various possible applications of the image matching apparatus 2000. For example, the image matching apparatus 2000 can be used as a part of a system (hereinafter, a geo-localization system) that performs image geo-localization. Image geo-localization is a technique to determine the place at which an input image is captured. Note that, the geo-localization system is merely an example of the application of the image matching apparatus 2000, and the application of the image matching apparatus 2000 is not limited to being used in the geo-localization system.

Figure 12:
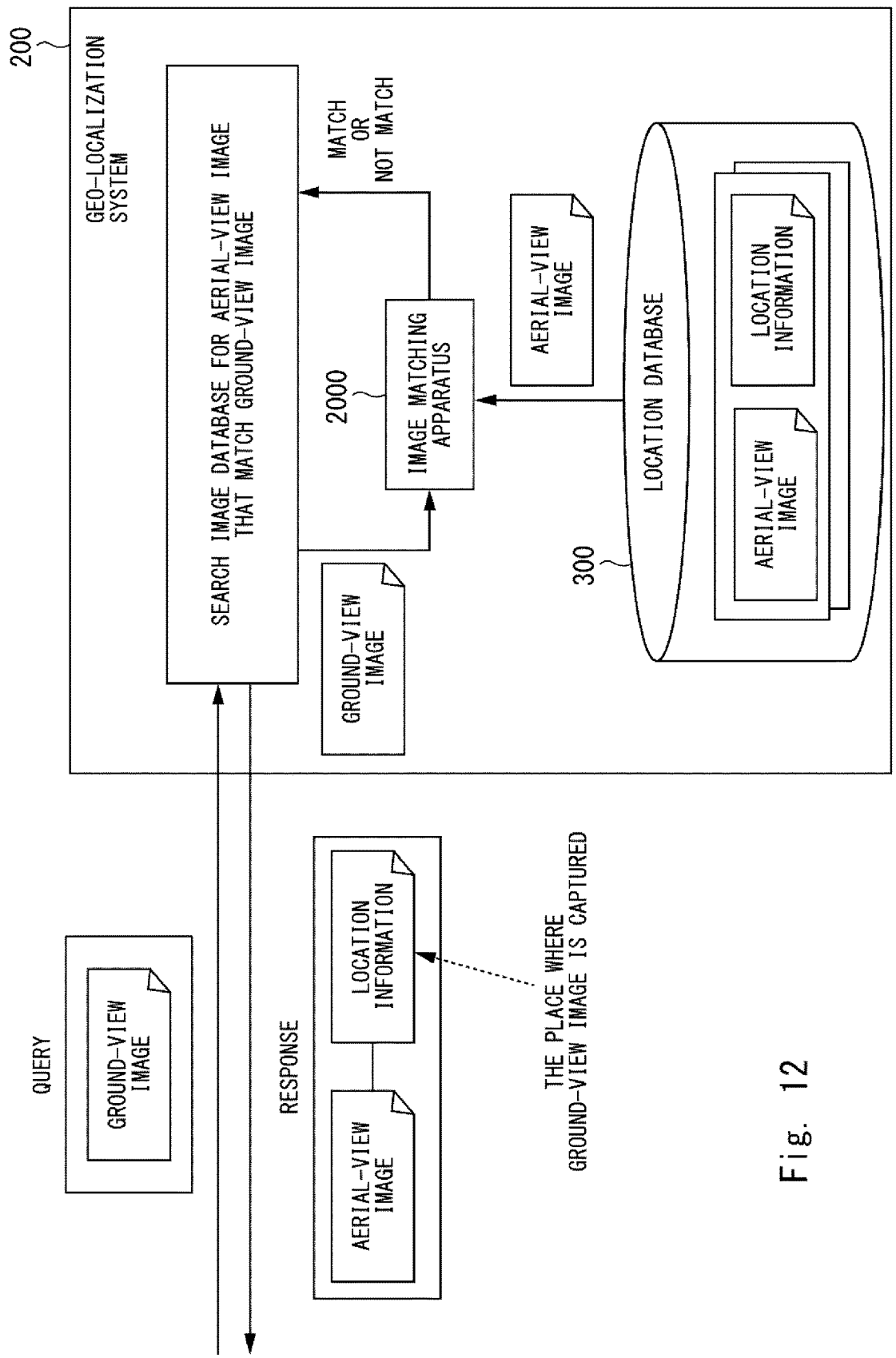
FIG. 12 illustrates a geo-localization system that includes the discriminator.

FIG. 12 illustrates a geo-localization system 200 that includes the image matching apparatus 2000. The geo-localization system 200 includes the image matching apparatus 2000 and the location database 300. The location database 300 includes a plurality of aerial-view images to each of which location information is attached. An example of the location information may be a GPS (Global Positioning System) coordinate of the place captured in the corresponding aerial-view image.

The geo-localization system 200 receives a query that includes a ground-view image from a client (e.g. user terminal), and searches the location database 300 for the aerial-view image that matches the ground-view image in the received query, thereby determining the place at which the ground-view image is captured. Specifically, until the aerial-view image that matches the ground-view image in the query is detected, the geo-localization system 200 repeatedly executes to: acquire one of the aerial-view images from the location database 300; input the ground-view image and the acquired aerial-view image into the image matching apparatus 2000; and determine whether the output of the image matching apparatus 2000 indicates that the ground-view image matches the aerial-view image. By doing so, the geo-localization system 200 can find the aerial-view image that includes the place at which the ground-view image is captured. Since the detected aerial-view image is associated with the location information such as the GPS coordinate, the geo-localization system 200 can recognize that where the ground-view image is captured is the place that is indicated by the location information associated with the aerial-view image that matches the ground-view image.

Note that the geo-localization system 200 may be implemented by one or more arbitrary computers such as ones depicted in FIG. 6.

<Acquisition of Images: S102>

The image matching apparatus 2000 acquires the ground-view image 20 and the aerial-view image 30 (S102). There are various ways to acquires those images. For example, the image matching apparatus 2000 may receive a set of the ground-view image 20 and the aerial-view image 30 sent from another computer. In another example, the image matching apparatus 2000 may retrieve a set of the ground-view image 20 and the aerial-view image 30 from a storage device to which it has access.

In another example, as illustrated in FIG. 12, the image matching apparatus 2000 may receive the ground-view image 20 sent from another computer, and search for the aerial-view image that matches the ground-view image 20. In this case, the image matching apparatus 2000 repeatedly acquires the aerial-view images 30 from a storage device until the aerial-view image 20 matching the ground-view image 30 is found. Similarly, the image matching apparatus 2000 may receive the aerial-view image 30 sent from another computer, and search for the ground-view image 20 that matches the aerial-view image 30.

<Generation of Non-Attention Feature Map: S204, S304, S404, S504>

The image matching apparatus 2000 generates the non-attention ground-view feature maps (e.g. the first non-attention ground-view feature map 21 (S204) and the second non-attention ground-view feature map 24 (S304)) and the non-attention aerial-view feature maps (e.g. the first non-attention aerial-view feature map 31 (S404) and the second non-attention aerial-view feature map 34 (S504)). Note that, hereinafter, the non-attention ground-view feature maps and the non-attention aerial-view feature maps are collectively described as "non-attention feature map".

Each non-attention feature map may be generated by performing a convolution operation on source data (input data) once or more times. For example, the first layer extractor 2022 performs convolution operations on the ground-view image 20 to generate the first non-attention ground-view feature map 21. The second layer extractor 2024 performs convolution operations on the first non-attention ground-view feature map 24 to generate the second non-attention ground-view feature map 26. The first layer extractor 2042 performs convolution operations on the aerial-view image 30 to generate the first non-attention aerial-view feature map 31. The second layer extractor 2044 performs convolution operations on the first non-attention aerial-view feature map 34 to generate the second non-attention aerial-view feature map 36.

The convolution operations mentioned above may be realized by a neural network having one or more convolution layers. In this case, the first layer extractor 2022, the second ground-view feature extractor 2024, the first layer extractor 2042, and the second layer extractor 2044 have a neural network with one or more convolution layers that generates a non-attention feature map from an input data. Note that each one of the neural networks generating a non-attention feature map may include not only convolution layers, but also other types of layers such as pooling layers and activation layers.

<Generation of Attention Map: S206, S306, S406, S506>

The image matching apparatus 2000 generates attention maps, such as the first ground-view attention map 22 (S206), the second ground-view attention map (S306), the first aerial-view attention map 32 (S406), and the second aerial-view attention map 35 (S506). It is possible to employ a well-known technique to generate an attention map. For example, an attention map may be generated using a neural network having one or more convolution layers. Note that each neural network may include not only convolution layers, but also other types of layers such as pooling layers and activation layers.

Note that the image matching apparatus 2000 may generate multiple attention maps for each one of the non-attention feature maps. For example, the first layer extractor 2022 may generate a plurality of the first ground-view attention maps 22 from the ground-view image 20. It is also possible to employ a well-known technique to generate multiple attention maps from a single source (image or feature map). For example, multiple neural networks that are differently initialized from each other (e.g. randomly initialized) are prepared for generating multiple attention maps from a single source. Since those neural networks are differently initialized from each other, they are trained to generate multiple attention maps different from each other.

<Generation of Attention Feature Map: S208, S308, S408, S508>

The image matching apparatus 2000 generates the attention ground-view feature maps (e.g. the first attention ground-view feature map 23 (S208) and the second attention ground-view feature map 26 (S308)) and the aerial-view feature maps (e.g. the first attention aerial-view feature map 33 (S408) and the second attention aerial-view feature map 34 (S508)). Note that, hereinafter, the attention ground-view feature maps and the attention aerial-view feature maps are collectively described as "attention feature map".

It is possible to employ a well-known technique to generate the attention feature map from the feature map and the attention map. For example, the attention feature map may be computed as a dot product of the feature map and the attention map. In this case, the first layer extractor 2022 computes a dot product of the first non-attention ground-view feature map 21 and the first ground-view attention map 22 to generate the first attention ground-view feature map 23. The second layer extractor 2024 computes a dot product of the second non-attention ground-view feature map 24 and the second ground-view attention map 25 to generate the second attention ground-view feature map 26. The first layer extractor 2042 computes a dot product of the first non-attention aerial-view feature map 31 and the first aerial-view attention map 32 to generate the first attention aerial-view feature map 33. The second layer extractor 2044 computes a dot product of the second non-attention aerial-view feature map 34 and the second aerial-view attention map 35 to generate the second attention aerial-view feature map 36.

Note that when the multiple attention maps are generated for each one of the non-attention feature maps, multiple attention feature maps are generated for each one of the non-attention feature maps. For example, when the first layer extractor 2022 generates a plurality of the first ground-view attention maps 22, it generates a plurality of the first attention ground-view feature maps 23 that are derived from one of the plurality of the first ground-view attention maps different from each other.

<As to Case where Three or More Layers Exist>

Although FIGS. 2 to 5 illustrates an example case where there are two layers of units to generate feature maps, the image matching apparatus 2000 may include three or more layers of units to do so. In this case, the image matching apparatus 2000 may generate more feature maps in the same manner. Specifically, the image matching apparatus 2000 generates an i-th non-attention ground-view feature map by extracting features from an (i−1)-th non-attention ground-view feature map (i is an integer larger than three). The image matching apparatus 2000 generates an i-th ground-view attention map from the (i−1)-th non-attention ground-view feature map. The image matching apparatus 2000 generates an i-th attention ground-view feature map by applying the i-th ground-view attention map to the i-th non-attention ground-view feature map.

Similarly, the image matching apparatus 2000 generates an i-th non-attention aerial-view feature map by extracting features from an (i−1)-th non-attention aerial-view feature map. The image matching apparatus 2000 generates an i-th aerial-view attention map from the (i−1)-th non-attention aerial-view feature map. The image matching apparatus 2000 generates an i-th attention aerial-view feature map by applying the i-th aerial-view attention map to the i-th non-attention aerial-view feature map.

<Computing Similarity Score: S108>

The determination unit 2060 computes the similarity score for the ground-view image 20 and the aerial-view image 30 based on the ground-view feature maps and the aerial-view feature maps (S108). The similarity score indicates a degree of similarity between the ground-view image 20 and the aerial-view image 30.

There are various ways to compute the similarity score based on the ground-view feature maps and the aerial-view feature maps. For example, the determination unit 2060 generate a concatenation of the ground-view feature maps and a concatenation of the aerial-view feature maps, and computes a degree of similarity between those two concatenations as the similarity score.

Various metrics can be used to compute a degree of similarity between the two concatenations mentioned above. For example, the degree of similarity therebetween can be represented by various types of distance (e.g. L2 distance), cosine similarity, or NN (neural network) based similarity. The NN based similarity is the degree of the similarity computed by a neural network that is trained to compute the degree of similarity between two input data (in this case, the concatenation of the ground-view feature maps and the concatenation of the aerial-view feature maps).

In another example, the determination unit 2060 may computes a degree of similarity for each one of all possible pairs of the ground-view feature map and the aerial-view feature map, and use one or more of those degrees of similarity to compute the similarity score. In the case depicted by FIGS. 2 to 5, the determination unit 2060 computes a degree of similarity for each one of possible 4×4(=16) pairs of the ground-view feature map and the aerial-feature map. Note that various metrics can be used to compute a degree of similarity between the ground-view feature map and the aerial-view feature map, such as various types of distances, cosine similarity, and a NN based similarity.

For example, the determination unit 2060 uses a maximum of the degrees of similarity computed for each one of all possible pairs of the ground-view feature map and the aerial-view feature map as the similarity score. In another example, the determination unit 2060 uses a statistical value (e.g. average, mode, etc.) that is computed from all or some of the degrees of similarity computed for each one of all possible pairs of the ground-view feature map and the aerial-view feature map as the similarity score. When using some of the degrees of similarity, for example, the determination unit 2060 uses the first to m-th largest degrees of similarity (m is a predefined integer larger than two).

Note that computing a degree of similarity for each possible pair of the ground-view feature map and the aerial-view feature map enables it to perform cross-scale matching between the ground-view feature map and the aerial-view feature map, since the feature maps output from layers at different levels from each other are compared. Because a scope of the scene captured in the ground-view image 20 can be different from a scope of the scene capture in the aerial-view image 30, it is possible that a ground-view feature map has high similarity to an aerial-view feature map output from the layer at a level different from that of the layer outputting that ground-view feature map. The cross-scale matching between the ground-view feature map and the aerial-view feature map is effective to find such high similarity between the feature maps output from layers at different levels from each other.

The determination unit 2060 may utilize results of both of within-scale comparisons and cross-scale comparisons. Note that a within-scale comparison is a process of computing a degree of similarity between the ground-view feature map and the aerial-view feature map that are output from the same layer as each other.

For example, the determination unit 2060 determines a maximum degree of similarity between the ground-view feature map and the aerial-view feature map within the same scale (i.e. a maximum degree of similarity among those computed for the pairs of the ground-view feature map and the aerial-view feature map that are generated from the same layer as each other). In addition, the determination unit 2060 also determines a maximum degree of similarity between the ground-view feature map and the aerial-view feature map across different scales (i.e. a maximum degree of similarity among those computed for the pairs of the ground-view image and the aerial-view image that are generated from the layers different from each other). Then, the determination unit 2060 computes the similarity score based on the two types of the determined maximum degrees of similarity. For example, the determination unit 2060 uses the statistical value (e.g. average value) of the determined degrees of similarity as the similarity score.

<Image Matching Based on Similarity Score: S110>

The determination unit 2060 determines whether the ground-view image 20 matches the aerial-view image 30 based on the similarity score (S110). Conceptually, the higher the degree of similarity between the ground-view image and the aerial-view image 30 is, the higher the possibility of that the ground-view image 20 matches the aerial-view image 30 is. Therefore, for example, the determination unit 2060 determines that the ground-view image 20 matches the aerial-view image 30 when the similarity score is equal to or larger than a predefined threshold. On the other hand, the determination 2100 determines that the ground-view image 20 does match the aerial-view image 30 when the similarity score is less than a predefined threshold. Note that, in this case, the similarity score is assumed to become larger as the degree of similarity between the ground-view feature map and the aerial-view feature map becomes higher.

<Training of Image Matching Apparatus 2000>

The image matching apparatus 2000 may be implemented with one or more learnt models such as neural networks. For example, as described above, the non-attention feature maps, the attention feature maps, and the attention maps can be generated by neural networks. In this case, for example, the ground-view feature extractor 2020 and the aerial-view feature extractor 2040 can be respectively implemented as a convolutional neural network (CNN).

When the image matching apparatus 2000 is implemented with learnt models, the image matching apparatus 2000 has to be trained using training dataset that includes a pair of a ground-view image and an aerial-view image. For example, the image matching apparatus 2000 can be trained based on a loss between the ground-view features and the aerial-view features that are computed from a training dataset, in a similar manner to train a Siamise network. The Siamise network is disclosed by, for example, NPL1.

Weights in the model are updated based on a loss computed using a predefined loss function. In the case where the similarity score is computed based on the concatenation of the ground-view feature maps and the concatenation of the aerial-view feature maps, the loss can be computed inputting those concatenations into the loss function. On the other hand, in the case where the similarity score is computed based on degrees of similarity computed for each pair of the ground-view feature map and the aerial-view feature map, the loss can be computed inputting the ground-view feature map and the aerial-view feature map that have a maximum degree of similarity into the loss function.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

SUPPLEMENTARY NOTES (Supplementary Note 1)

An image matching apparatus comprising:
at least one processor; and
memory storing instructions,
wherein the at least one processor is configured to execute the instructions to:
acquire a ground-view image and an aerial-view image;
generate ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map;
generate aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map;
compute a similarity score based on the ground-view feature maps and the aerial-view feature maps, the similarity score indicating a degree of similarity between the ground-view image and the aerial-view image; and determine whether the ground-view image matches the aerial-view image based on the similarity score.

(Supplementary Note 2)

The image matching apparatus according to supplementary note 1,
wherein the computation of the similarity score includes to compute a degree of similarity between a concatenation of the ground-view feature maps and a concatenation of the aerial-view feature maps as the similarity score.

(Supplementary Note 3)

The image matching apparatus according to supplementary note 1,
wherein the computation of the similarity score includes to:
compute a degree of similarity for each one of possible pairs of the ground-view feature map and the aerial-view feature map;
use a maximum value of the computed degrees of similarity as the similarity score.

(Supplementary Note 4)

The image matching apparatus according to supplementary note 1,
wherein the computation of the similarity score includes to:
compute a degree of similarity for each one of possible pairs of the ground-view feature map and the aerial-view feature map;
use a statistical value of some or all of the computed degrees of similarity as the similarity score.

(Supplementary Note 5)

The image matching apparatus according to any one of supplementary notes 2 to 4,
wherein the degree of similarity between two data is computed as a distance therebetween, a cosine similarity therebetween, or a neural network based similarity that is computed by a neural network trained to output the degree of similarity between two data.

(Supplementary Note 6)

A control method performed by a computer, comprising:
acquiring a ground-view image and an aerial-view image;
generating ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map;
generating aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map;
computing a similarity score based on the ground-view feature maps and the aerial-view feature maps, the similarity score indicating a degree of similarity between the ground-view image and the aerial-view image; and
determining whether the ground-view image matches the aerial-view image based on the similarity score.

(Supplementary Note 7)

The control method according to supplementary note 6,
wherein the computation of the similarity score includes to compute a degree of similarity between a concatenation of the ground-view feature maps and a concatenation of the aerial-view feature maps as the similarity score.

(Supplementary Note 8)

The control method according to supplementary note 6,
wherein the computation of the similarity score includes to:
compute a degree of similarity for each one of possible pairs of the ground-view feature map and the aerial-view feature map;
use a maximum value of the computed degrees of similarity as the similarity score.

(Supplementary Note 9)

The control method according to supplementary note 6,
wherein the computation of the similarity score includes to:
compute a degree of similarity for each one of possible pairs of the ground-view feature map and the aerial-view feature map;
use a statistical value of some or all of the computed degrees of similarity as the similarity score.

(Supplementary Note 10)

The control method according to any one of supplementary notes 6 to 9,
wherein the degree of similarity between two data is computed as a distance therebetween, a cosine similarity therebetween, or a neural network based similarity that is computed by a neural network trained to output the degree of similarity between two data.

(Supplementary Note 11)

A non-transitory computer readable storage medium storing a program that causes a computer to execute:
acquiring a ground-view image and an aerial-view image;
generating ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map;
generating aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map;

computing a similarity score based on the ground-view feature maps and the aerial-view feature maps, the similarity score indicating a degree of similarity between the ground-view image and the aerial-view image; and determining whether the ground-view image matches the aerial-view image based on the similarity score.

(Supplementary Note 12)

The storage medium according to supplementary note 11, wherein the computation of the similarity score includes to compute a degree of similarity between a concatenation of the ground-view feature maps and a concatenation of the aerial-view feature maps as the similarity score.

(Supplementary Note 13)

The storage medium according to supplementary note 11, wherein the computation of the similarity score includes to:

compute a degree of similarity for each one of possible pairs of the ground-view feature map and the aerial-view feature map;

use a maximum value of the computed degrees of similarity as the similarity score.

(Supplementary Note 14)

The storage medium according to supplementary note 11, wherein the computation of the similarity score includes to:

compute a degree of similarity for each one of possible pairs of the ground-view feature map and the aerial-view feature map;

use a statistical value of some or all of the computed degrees of similarity as the similarity score.

(Supplementary Note 15)

The storage medium according to any one of supplementary notes 11 to 14, wherein the degree of similarity between two data is computed as a distance therebetween, a cosine similarity therebetween, or a neural network based similarity that is computed by a neural network trained to output the degree of similarity between two data.

Reference Signs List 20 ground-view image
21 first non-attention ground-view feature map
22 first ground-view attention map
23 first attention ground-view feature map
24 second non-attention ground-view feature map
25 second ground-view attention map
26 second attention ground-view feature map
30 aerial-view image
31 first non-attention aerial-view feature map
32 first aerial-view attention map
33 first attention aerial-view feature map
34 second non-attention aerial-view feature map
35 second aerial-view attention map
36 second attention aerial-view feature map
200 geo-localization system
300 location database
1000 computer
1020 bus
1040 processor
1060 memory
1080 storage device
1100 input/output interface
1120 network interface
2000 image matching apparatus
2020 ground-view feature extractor
2022 first layer extractor
2024 second layer extractor
2040 aerial-view feature extractor
2042 first layer extractor
2044 second layer extractor
2060 determination unit

What is claimed is:

1. An image matching apparatus comprising:
at least one processor; and
memory storing instructions,
wherein the at least one processor is configured to execute the instructions to:
acquire a ground-view image and an aerial-view image;
generate ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map;
generate aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map;
compute a similarity score based on the ground-view feature maps and the aerial-view feature maps, the similarity score indicating a degree of similarity between the ground-view image and the aerial-view image; and
determine whether the ground-view image matches the aerial-view image based on the similarity score.

2. The image matching apparatus according to claim 1, wherein the computation of the similarity score includes to compute a degree of similarity between a concatenation of the ground-view feature maps and a concatenation of the aerial-view feature maps as the similarity score.

3. The image matching apparatus according to claim 2, wherein the degree of similarity between two data is computed as a distance therebetween, a cosine similarity therebetween, or a neural network based similarity that is computed by a neural network trained to output the degree of similarity between two data.

4. The image matching apparatus according to claim 1,
wherein the computation of the similarity score includes to:
  compute a degree of similarity for each one of possible pairs of the ground-view feature map and the aerial-view feature map;
  use a maximum value of the computed degrees of similarity as the similarity score.

5. The image matching apparatus according to claim 1,
wherein the computation of the similarity score includes to:
  compute a degree of similarity for each one of possible pairs of the ground-view feature map and the aerial-view feature map;
  use a statistical value of some or all of the computed degrees of similarity as the similarity score.

6. A control method performed by a computer, comprising:
  acquiring a ground-view image and an aerial-view image;
  generating ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map;
  generating aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map;
  computing a similarity score based on the ground-view feature maps and the aerial-view feature maps, the similarity score indicating a degree of similarity between the ground-view image and the aerial-view image; and
  determining whether the ground-view image matches the aerial-view image based on the similarity score.

7. The control method according to claim 6,
wherein the computation of the similarity score includes to compute a degree of similarity between a concatenation of the ground-view feature maps and a concatenation of the aerial-view feature maps as the similarity score.

8. The control method according to claim 6,
wherein the computation of the similarity score includes to:
  compute a degree of similarity for each one of possible pairs of the ground-view feature map and the aerial-view feature map;
  use a maximum value of the computed degrees of similarity as the similarity score.

9. The control method according to claim 6,
wherein the computation of the similarity score includes to:
  compute a degree of similarity for each one of possible pairs of the ground-view feature map and the aerial-view feature map;
  use a statistical value of some or all of the computed degrees of similarity as the similarity score.

10. The control method according to claim 6,
wherein the degree of similarity between two data is computed as a distance therebetween, a cosine similarity therebetween, or a neural network based similarity that is computed by a neural network trained to output the degree of similarity between two data.

11. A non-transitory computer readable storage medium storing a program that causes a computer to execute:
  acquiring a ground-view image and an aerial-view image;
  generating ground-view feature maps that are feature maps derived from the ground-view image, the ground-view feature maps including: a first non-attention ground-view feature map that is generated by extracting features from the ground-view image; a first attention ground-view feature map that is generated by applying an attention map on the first non-attention ground-view feature map; a second non-attention ground-view feature map that is generated by extracting features from the first non-attention ground-view feature map; and a second attention ground-view feature map that is generated by applying an attention map on the second non-attention ground-view feature map;
  generating aerial-view feature maps that are feature maps derived from the aerial-view image, the aerial-view feature maps including: a first non-attention aerial-view feature map that is generated by extracting features from the aerial-view image; a first attention aerial-view feature map that is generated by applying an attention map on the first non-attention aerial-view feature map; a second non-attention aerial-view feature map that is generated by extracting features from the first non-attention aerial-view feature map; and a second attention aerial-view feature map that is generated by applying an attention map on the second non-attention aerial-view feature map;
  computing a similarity score based on the ground-view feature maps and the aerial-view feature maps, the similarity score indicating a degree of similarity between the ground-view image and the aerial-view image; and
  determining whether the ground-view image matches the aerial-view image based on the similarity score.

12. The storage medium according to claim 11,
wherein the computation of the similarity score includes to compute a degree of similarity between a concatenation of the ground-view feature maps and a concatenation of the aerial-view feature maps as the similarity score.

13. The storage medium according to claim 11,
wherein the computation of the similarity score includes to:
  compute a degree of similarity for each one of possible pairs of the ground-view feature map and the aerial-view feature map;
  use a maximum value of the computed degrees of similarity as the similarity score.

14. The storage medium according to claim 11,
wherein the computation of the similarity score includes to:

compute a degree of similarity for each one of possible pairs of the ground-view feature map and the aerial-view feature map;
use a statistical value of some or all of the computed degrees of similarity as the similarity score.

15. The storage medium according to claim 11,
wherein the degree of similarity between two data is computed as a distance therebetween, a cosine similarity therebetween, or a neural network based similarity that is computed by a neural network trained to output the degree of similarity between two data.

* * * * *